United States Patent
Sharma et al.

(10) Patent No.: US 11,090,588 B2
(45) Date of Patent: Aug. 17, 2021

(54) WATER FILTRATION SYSTEM

(71) Applicant: PepsiCo, Inc., Purchase, NY (US)

(72) Inventors: Vikas Kumar Sharma, Branchburg, NJ (US); Shriram Venkataraman, Danbury, CT (US)

(73) Assignee: PepsiCo, Inc., Purchase, NY (US)

( * ) Notice: Subject to any disclaimer, the term of this patent is extended or adjusted under 35 U.S.C. 154(b) by 206 days.

(21) Appl. No.: 15/851,097

(22) Filed: Dec. 21, 2017

(65) Prior Publication Data
US 2019/0193007 A1 Jun. 27, 2019

(51) Int. Cl.
*B01D 35/30* (2006.01)
*C02F 1/00* (2006.01)
(Continued)

(52) U.S. Cl.
CPC ............ *B01D 35/30* (2013.01); *B01D 29/23* (2013.01); *B01D 29/56* (2013.01); *B01D 29/58* (2013.01);
(Continued)

(58) Field of Classification Search
CPC ........ B01D 29/23; B01D 29/56; B01D 29/58; B01D 35/1435; B01D 35/30; B01D 2239/0414; B01D 2239/0442; B01D 2239/1208; C02F 1/003; C02F 1/283; C02F 1/42; C02F 2001/427; C02F 1/444; C02F 1/68; C02F 1/688; C02F 9/005; C02F 9/2201; C02F 9/006; C02F 2209/008; C02F 2209/445; C02F 2307/06; C02F 2307/10; C02F 2307/12
(Continued)

(56) References Cited

U.S. PATENT DOCUMENTS 4,681,677 A * 7/1987 Kuh ..................... B01D 35/143
210/88
4,913,808 A * 4/1990 Haque .................... B01J 47/024
210/93
(Continued)

FOREIGN PATENT DOCUMENTS

CN 202688137 U 1/2013
WO 2009135113 A1 11/2009
WO 2013126662 A9 11/2013

OTHER PUBLICATIONS

International Search Report and Written Opinion issued in International Application No. PCT/US2018/066034, dated Mar. 1, 2019.

*Primary Examiner* — Matthew O Savage
(74) *Attorney, Agent, or Firm* — Sterne, Kessler, Goldstein & Fox P.L.L.C.

(57) ABSTRACT

A water-filtration system includes four distinct porous media through which water is sequentially routed in a compact, self-contained four-stage filtration process. The porous media improves water quality by removing unwanted contaminants from the water and adding minerals and compounds to the water to improve water taste. A housing contains the the porous media. The housing includes connection points for incoming and outgoing water. The water-filtration system may be inserted into a water line upstream of a desired source of high-quality water, or may be integrated directly into an appliance or device that requires high-quality water.

15 Claims, 10 Drawing Sheets

(51) Int. Cl.
*B01D 35/143* (2006.01)
*B01D 29/58* (2006.01)
*B01D 29/23* (2006.01)
*C02F 9/00* (2006.01)
*B01D 29/56* (2006.01)
*C02F 1/28* (2006.01)
*C02F 1/42* (2006.01)
*C02F 1/44* (2006.01)

(52) U.S. Cl.
CPC .......... *B01D 35/1435* (2013.01); *C02F 1/003* (2013.01); *C02F 9/005* (2013.01); *B01D 2239/0414* (2013.01); *B01D 2239/0442* (2013.01); *B01D 2239/1208* (2013.01); *C02F 1/283* (2013.01); *C02F 1/42* (2013.01); *C02F 1/444* (2013.01); *C02F 2201/006* (2013.01); *C02F 2209/008* (2013.01); *C02F 2209/445* (2013.01); *C02F 2307/06* (2013.01); *C02F 2307/10* (2013.01)

(58) Field of Classification Search
USPC ........................................................ 210/669
See application file for complete search history.

(56) References Cited

U.S. PATENT DOCUMENTS

| | | | | |
|---|---|---|---|---|
| 5,135,645 | A * | 8/1992 | Sklenak | B01D 29/96 210/117 |
| 5,725,777 | A * | 3/1998 | Taylor | A61L 2/022 210/232 |
| 5,753,107 | A * | 5/1998 | Magnusson | B01D 35/153 210/109 |
| 6,197,193 | B1 * | 3/2001 | Archer | C02F 1/003 210/266 |
| 2003/0042201 | A1 * | 3/2003 | Sizelove | A61K 35/02 210/639 |
| 2004/0206682 | A1 * | 10/2004 | Hamlin | B01D 19/0031 210/321.6 |
| 2006/0065601 | A1 * | 3/2006 | Baird | B01D 61/025 210/652 |
| 2011/0186496 | A1 * | 8/2011 | Pedersen | C02F 1/002 210/198.1 |
| 2012/0292247 | A1 * | 11/2012 | Moon | B01D 39/2055 210/446 |
| 2012/0297817 | A1 | 11/2012 | Krause et al. | |
| 2016/0023918 | A1 * | 1/2016 | Kellam | B01D 24/007 210/668 |
| 2016/0075566 | A1 * | 3/2016 | Froelicher | B01D 35/30 210/236 |
| 2016/0244337 | A1 | 8/2016 | Patera et al. | |
| 2020/0255300 | A1 * | 8/2020 | Murrell | C02F 1/002 |

* cited by examiner

WATER FILTRATION SYSTEM

BRIEF SUMMARY

Embodiments of the present invention provide water filtration that can quickly deliver high-quality filtered water with enhanced taste. For example, embodiments include a water filter including a housing containing a water inlet for receiving water and a water outlet for supplying water. The water inlet is fluidly connected to the water outlet. Between the water inlet and the water outlet, the water passes through a number of porous filtration media inside the housing, including a first porous medium (e.g., an activated carbon filter) configured to remove organic and inorganic compounds from the water, a second porous medium (e.g., an antimicrobial membrane) configured to remove microbial organisms from the water, a third porous medium (e.g., an ion-exchange resin) configured to adjust a level of dissolved minerals in the water, and a fourth porous medium configured to enhance taste of the water. The housing may route water from the water inlet through each of the four porous media to the water outlet, for example, by channels through the housing.

The housing may route water through each of the four porous media in the sequence mentioned above. The porous media may be contained within the housing in cylindrical formats. For example, all of the porous media may be contained within a single cylindrical chamber of the housing. Or the housing may have two cylindrical chambers, each containing at least one (e.g., two) of the porous media.

The housing may be easily attachable to and removable from an appliance or water supply (e.g., a water supply of an appliance, such as a refrigerator) without the use of tools.

In some embodiments, the housing may include a communication interface to communicate data to another device, such as an appliance in which it is installed. This data may relate to a remaining life of its porous filtration media, which can help a user know when to change the filter or its media.

BRIEF DESCRIPTION OF THE FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

DETAILED DESCRIPTION

The present invention(s) will now be described in detail with reference to embodiments thereof as illustrated in the accompanying drawings. References to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Water filtration may be used to improve the quality and taste of water both in and out of the home. However, existing technologies such as carbon, ultrafiltration, and reverse osmosis may not adequately meet all water-filtration goals. While solutions such as reverse osmosis can deliver filtered water, reverse osmosis is a slow process and the resulting water may not possess an optimal taste. Taste-enhancing solutions for filtered water exist, but often involve an additional product, device, or step taken by the consumer. Embodiments of the present invention improve on past systems at least by providing an all-in-one water-filtration system that can quickly deliver high-quality filtered water with enhanced taste.

Figure 1:
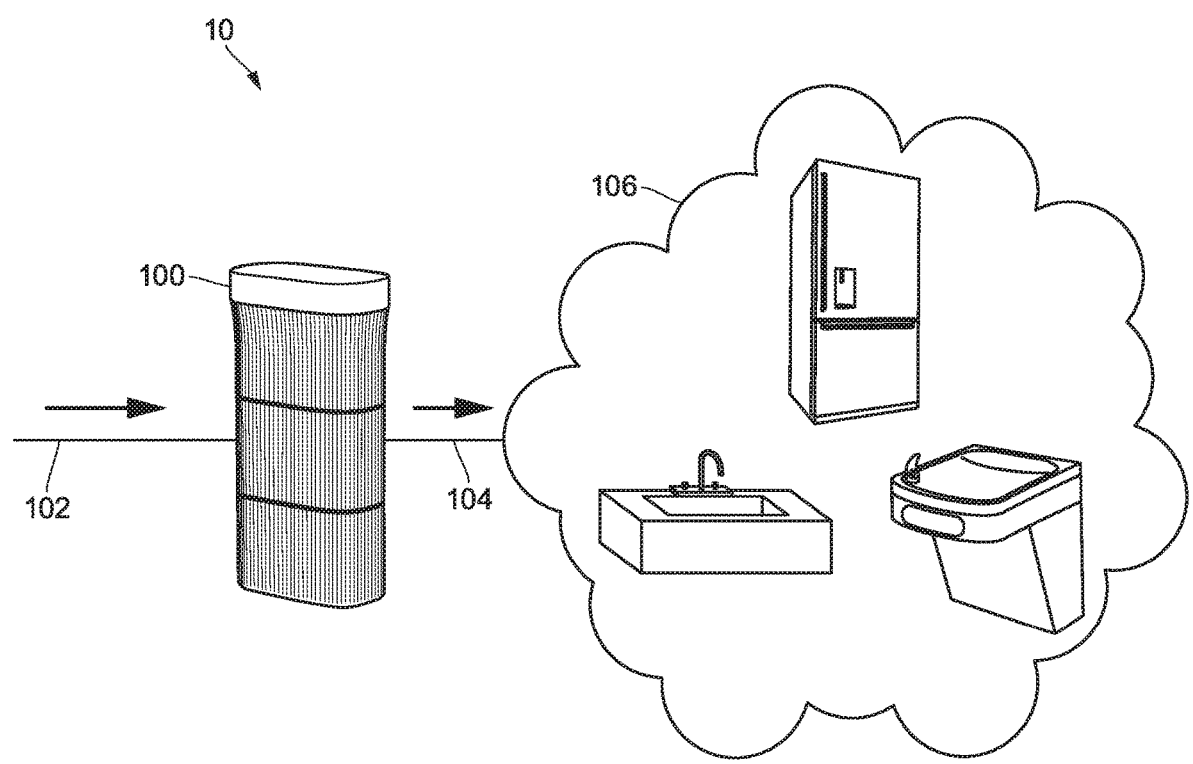
FIG. 1 is a system level view of a water-filtration system connected to a water supply and an end use.

As shown in FIG. 1, such a water-filtration system 10 may include a water filter 100 inserted upstream of a desired end use 106 of resulting treated water 104. For example, end use 106 may be a refrigerator, sink, or drinking fountain, as shown in FIG. 1. Water-filtration system 10 may include a water filter 100 that includes a four-stage process that filters and treats an untreated water supply 102, resulting in high-quality water with an enhanced taste.

Figure 2:
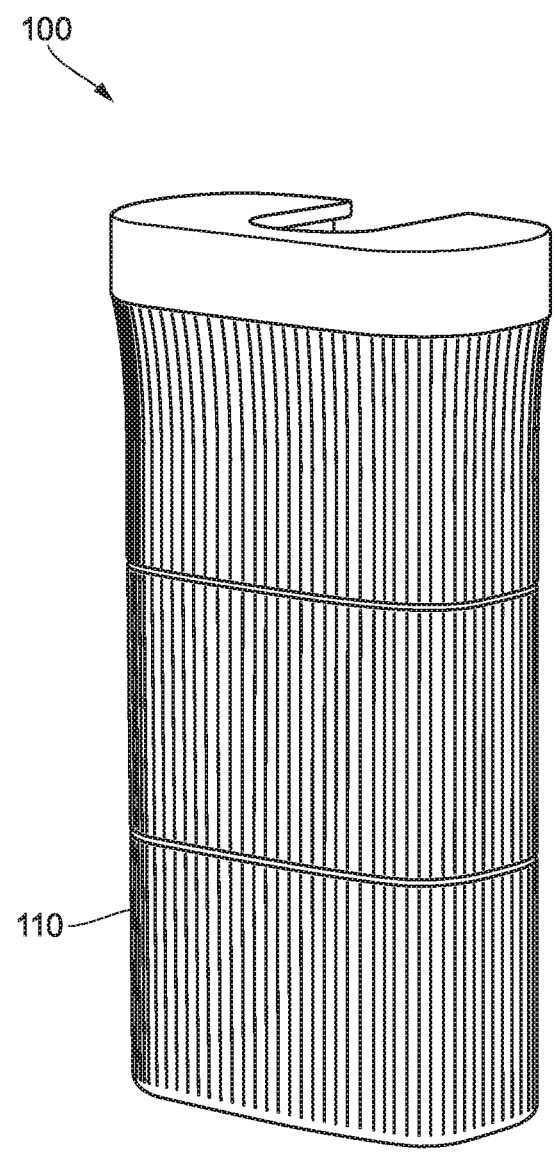
FIG. 2 is a front perspective view of the water-filtration system of FIG. 1.
Figure 3:
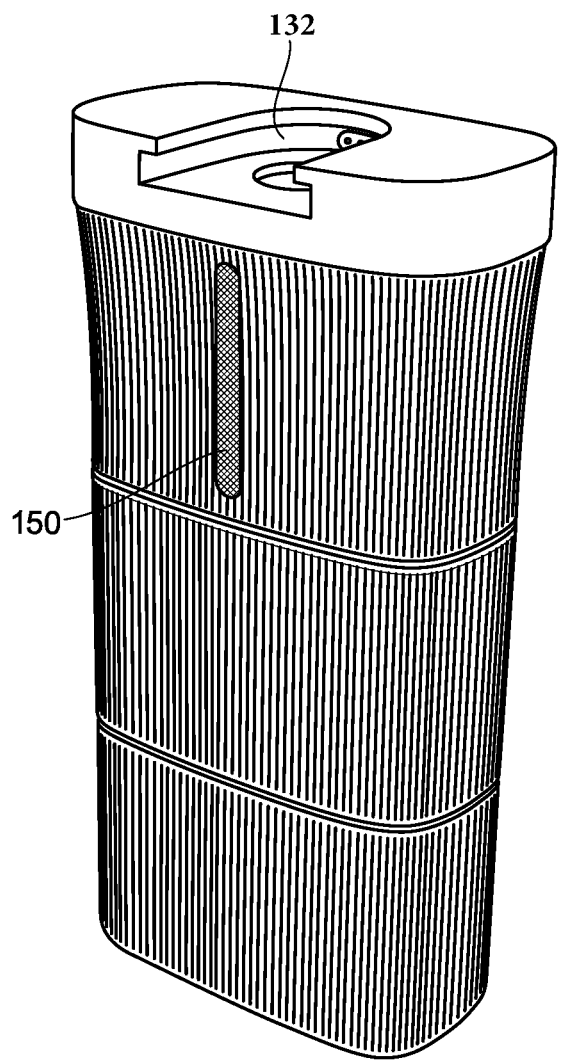
FIG. 3 is a rear perspective view of the water-filtration system of FIG. 1.

Water filter 100 may be installed in a variety of ways to suit a particular application. For example, it may be incorporated into an appliance such as a refrigerator or drinking fountain, or it may be put to use to filter water before it comes out of a water faucet at a sink. As shown in FIGS. 2 and 3, water filter 100 may be a self-contained unit, including an outer housing 110. Within outer housing, filter housing 130 (See FIG. 4) may house filtration or porous media 120, 122, 124, 126, as shown in FIG. 5.

Figure 5:
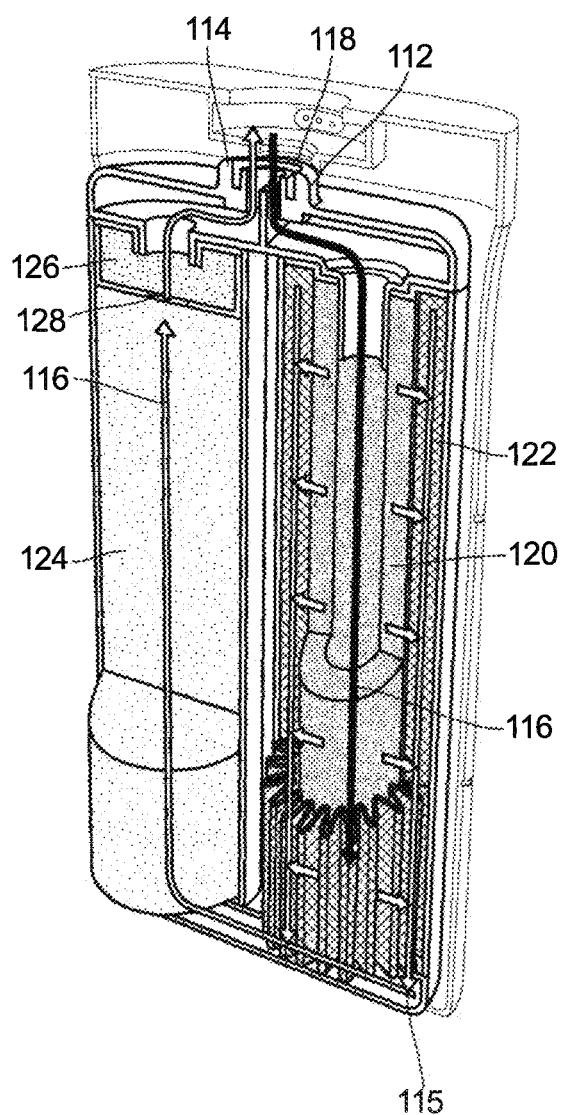
Figure 6:
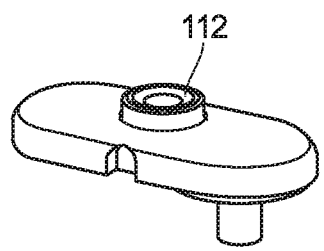
FIGS. 6 and 7 are exploded views of the water-filtration system FIG. 1.
Figure 6:
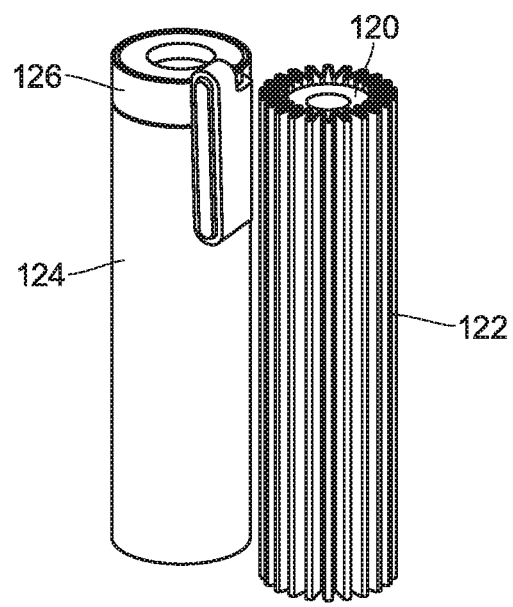
Figure 6:
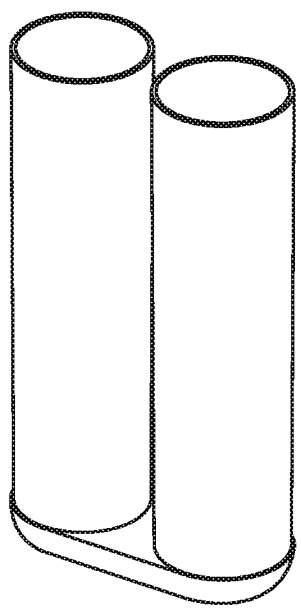
Figure 7:
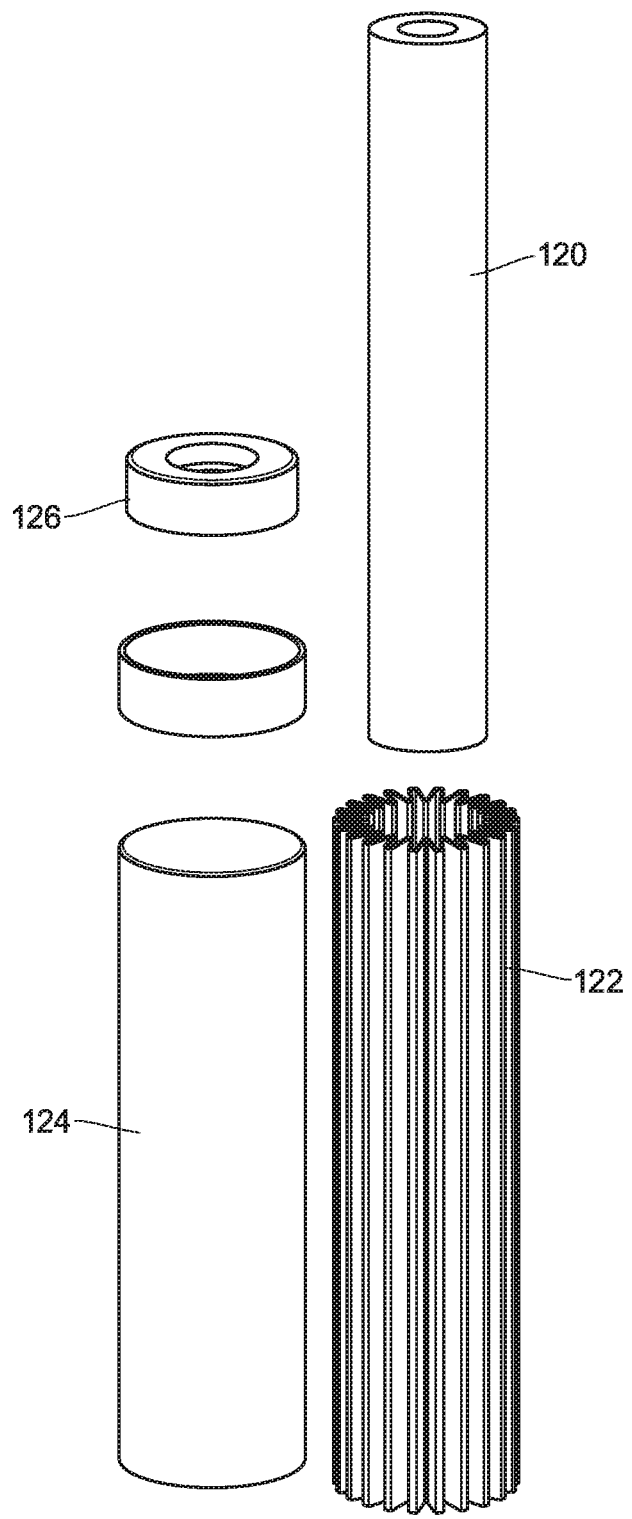

As shown by arrows 116 in FIG. 5, water from water supply 102 enters water filter 100 and passes through, in order, a first porous medium 120 that removes inorganic compounds such as dirt or dust particles and volatile organic compounds, and eliminates heavy metals; a second porous medium 122 that eliminates organic compounds and microbial organisms; a third porous medium 124 that removes specific contaminants, for example sodium, calcium and similar commonly occurring salts, and adjusts the level of total dissolved solids in the water; and a fourth porous medium 126 that enhances the taste of the supplied water.

First porous medium 120 may be activated carbon. The activated carbon may be bound together in a cylindrical shape, which may have a hollow core. In some embodiments, the hollow core is closed off at one end to force water to flow through its walls to reach second porous medium 122.

Second porous medium 122 may be an antimicrobial membrane that filters out microbial organisms (e.g., bacteria, viruses, or cysts) from the water. For example, second porous medium 122 may be a silver-activated membrane. The antimicrobial membrane may be formed of a differentiated media. It may be wrapped around first porous medium. In some embodiments, it may have an overall cylindrical format, and may have a sinusoidal cross-section forming the walls of the cylindrical format, as shown, for example, in FIG. 5. This construction allows for an increased surface area for second porous medium 122 to contact water flowing through water filter 100. In a further embodiment, the membrane may be designed to meet industry standards for filtering out microbial organisms, such as those standard created by the National Science Foundation.

Third porous medium 124 may be an ion-exchange resin that removes minerals, resulting in overall reduction of total dissolved solids (TDS) in the water. Third porous medium 124 may have a solid format (e.g., a cylinder as shown in FIG. 5) such that water is forced through it. In some embodiments, third porous medium 124 may be longer in the water flow direction than it is wide.

Fourth porous medium 126 may be mineral additives that impart a desired taste to the water. For example, fourth porous medium 126 may include a magnesium mineralizer that adds magnesium to the water. Fourth porous medium 126 may have a solid format (e.g., a cylinder as shown in FIG. 5) such that water is forced through it. In some embodiments, third porous medium 124 may be shorter in the water flow direction than it is wide. Fourth porous medium 126 may have a diameter that is the same as a diameter of third porous medium 124. Forth porous medium 126 be a length in the flow direction that is substantially less than a length of third porous medium 124 (e.g., the length of forth porous medium 126 may be 5% to 50% of the length of third porous medium 124).

In an embodiment, each of the porous media is separate and distinct from the other porous media, and water passes from one porous media to the next at an interface (e.g. interface 128) between two porous media. The resulting water features minimal contaminants and an enhanced taste.

Figure 4:
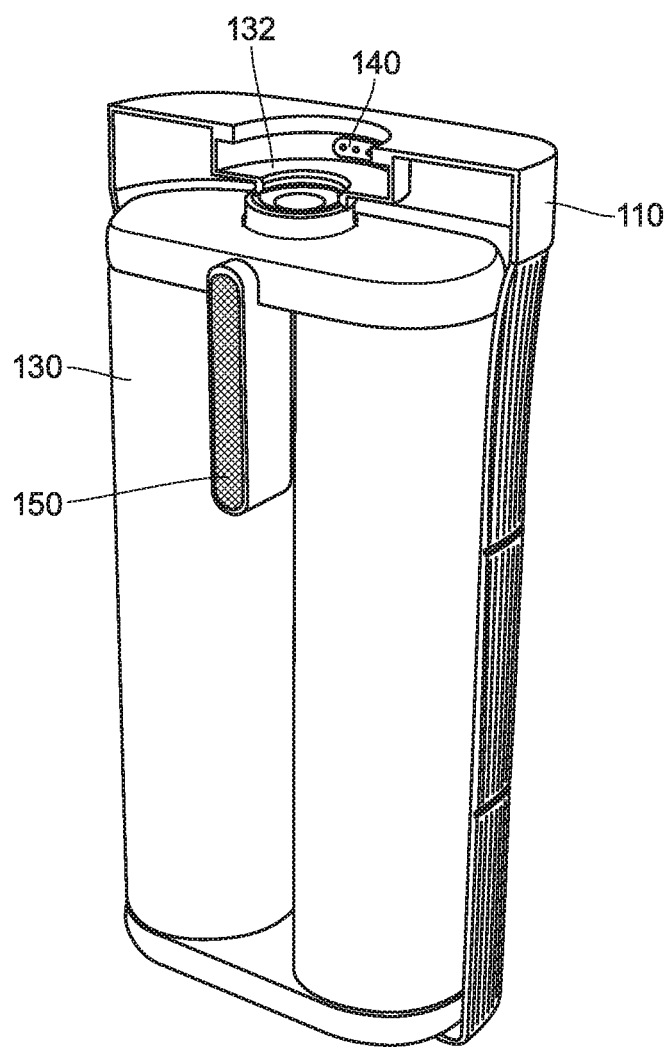
FIGS. 4 and 5 are partial cross-section views of the water-filtration system of FIG. 1.

As shown in FIGS. 4 and 5 all four porous media are contained in a housing 110, which features a dual-cylinder design, each cylinder housing two of the four porous media. The resulting water filter 100 produces high-quality water with an enhanced taste in a single package. Water filter 100 thus allows for integration of on-demand filtered and enhanced water in multiple different end uses.

Water filter 100 may be used in various applications found throughout an ordinary home or business. In one application, water filter 100 may be attached upstream of a water output of an appliance such as a refrigerator or ice maker. The appliance can then dispense the filtered water, in the case of the refrigerator, or produce ice with the filtered water, in the case of the ice maker. Water filter 100 may also be integrated into an appliance. This allows for easier installation of the appliance, with only one plumbing connection required. In another application, water-filtration system 10 may be attached to a dispensing system, such as in an under-counter application with a separate faucet located at the sink in a kitchen. An additional application might integrate water-filtration system 10 into a portable receptacle that uses gravity to draw untreated water in one compartment through water-filtration system 10 into a second compartment, which may be used as a beverage pitcher to serve drinks. Embodiments of water-filtration system 10 that are self-contained units might also be inserted into any water-supply line in order to provide high-quality filtered water to any downstream outlet or appliance. A further exemplary application may include larger-scale applications that filter water for multiple appliances or dispensing systems. End uses of water-filtration system 10 are not limited to those found inside a home, but may also include uses found in commercial settings such as restaurants, shopping malls, or office buildings.

Figure 10:
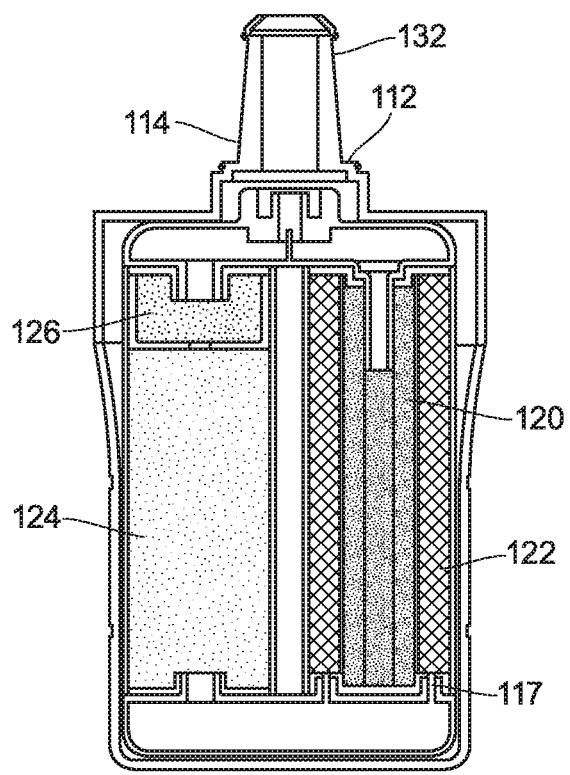

Housing 110 may be designed in various configurations. As shown in FIG. 5, housing 110 includes a water inlet 112 for receiving water (e.g., from water supply 102). Water inlet 112 may be designed with a female thread, a quick-connect fitting, or any other fitting that is commonly used to connect potable water plumbing. In an embodiment as shown in FIG. 10, an attachment interface 132 combines water inlet 112 and water outlet 114 into a single connection point, which makes replacement of the porous media easier in certain applications, such as when water-filtration system 10 is integrated into an appliance like a refrigerator. Housing 110 may contain the porous media internally, for example within filter housing 130. In either case, water filter 100 may include channeling to route water from water inlet 112 through the filtration media 120, 122, 124, 126 in sequence. For example, as shown in FIG. 5, arrows 116 indicate the flow of water through an embodiment of water filter 100. Water enters water inlet 112 and is channeled into the center of first porous medium 120. The water then flows outward through first porous medium 120 into second porous medium 122. Water channeling routes the water from the bottom of second porous medium 122 through third porous medium 124 and fourth porous medium 126 in sequence, and then to water outlet 114 to exit water filter 100.

As shown in FIG. 5, the internal structure of housing 110 routes water from water inlet 112, through filtration media 120, 122, 124, 126 in sequence, and then to a water outlet 114. In an embodiment, water inlet 112 and water outlet 114 may be combined into a single fitting 118 as shown in FIG. 5. This single fitting 118 keeps the incoming and outgoing water streams separated and provides a single connection point (e.g., for connection within an appliance or system) for easy connectivity. The result of passing the water through the different porous media stages is the removal of unwanted contaminants from the incoming water supply and addition of taste-enhancing minerals and compounds to the water that flows out of water outlet 114.

In the dual-cylinder arrangement of FIG. 5, the porous media are housed in two similar cylindrical chambers that are parallel and adjacent to each other. First porous medium 120 and second porous medium 122 are located in one of the cylinders of housing 110, while third porous medium 124 and fourth porous medium 126 are located in the other cylinder. In this embodiment, first porous medium 120 and second porous medium 122 are both formed as hollow cylinders, with first porous medium 120 sized to fit inside the hollow center of second porous medium 122. Third porous medium 124 and fourth porous medium 126 are formed as solid cylinders of the same diameter and are stacked on top of each other, with fourth porous medium 126 being located closer to water outlet 114. The flow of water is indicated in FIG. 5 with arrows 116 from water inlet 112 to water outlet 114. Water enters water inlet 112 and is guided by water channel 115 in housing 110 into one end of the hollow center of first porous medium 120. Housing 110 is shaped to block the opposite end of the hollow center of first porous medium 120. Water is thus forced to flow through the cylindrical walls of first porous medium 120, where it then encounters second porous medium 122. In a further embodiment, first porous medium 120 may include a closed end integrated into the porous medium, which acts to route the water through its walls without need for blocking by water channeling 115. Housing 110 has a cylindrical water channel 115 that aligns with the cylindrical walls of second porous medium 122. The cylindrical water channel 115 is located at an end of second porous medium 122 that is opposite the end of water filter 100 where the water enters through water inlet 112.

Figure 8:
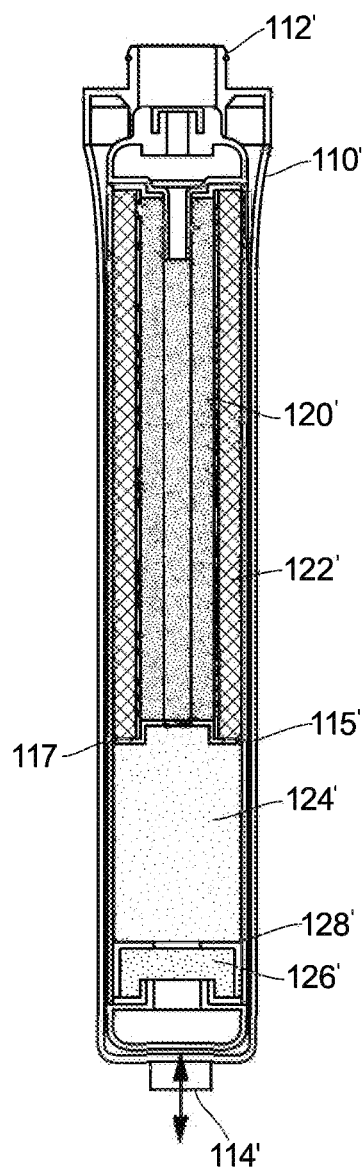
FIGS. 8-10 are cross-section views of alternative embodiments of a water-filtration system.
Figure 9:
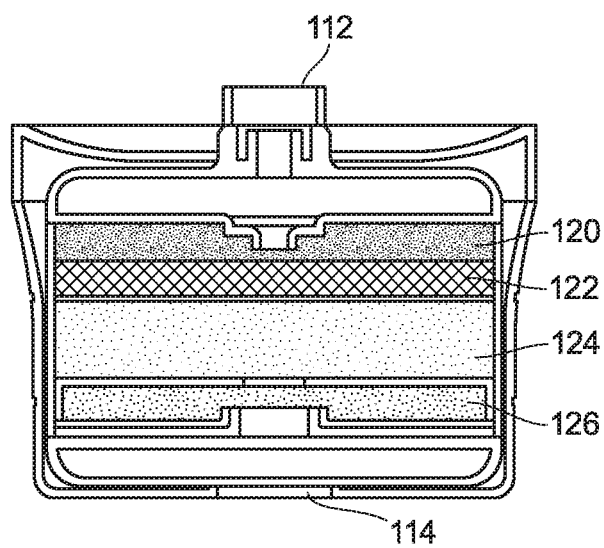

The cylindrical water channel 117, best seen in FIG. 8, is located at one end of second porous medium 122 and connects to channels 115 (or channels 115' in FIG. 8) in housing 110 that guide the water exiting second porous medium 122 to an end of third porous medium 124. The water passes through third porous medium 124 and enters fourth porous medium 124, which is in contact with third porous medium 122 at an interface 128 (e.g., faces of third porous medium 124 and fourth porous medium 124 may meet at interface 128). An exit channel 115 routes water that has traveled the full length of fourth porous medium 124 to water outlet 114. Housing 110 is designed such that third porous medium 122 and fourth porous medium 124 are fully contained with the exception of the entrance and exit water channeling, which forces all of the water to travel through the length of third porous medium 122 before entering fourth porous medium 124.

Various other arrangements of porous media are possible depending on the application. In an embodiment, as shown in FIG. 8, the porous media may reside in a single cylindrical chamber. In this embodiment, housing 110' is configured with a single cylindrical chamber that houses all four porous media. First porous medium 120' and second porous medium 122' are hollow cylinders as described in the dual-cylinder embodiment above. These first two stages are nested one inside another and are located in the upper half of the cylindrical chamber. The lower half of the cylindrical chamber includes third porous medium 124' and fourth porous medium 126', which are configured as solid cylinders stacked one on top of the other that meet at an interface 128'. Incoming water flows from water inlet 112', located at one end of the cylindrical chamber, into first porous medium 120', and then is passed through first porous medium 120' to second porous medium 122' as described in the previous embodiment. Water then flows into and through third porous medium 124' and fourth porous medium 126' in sequence. Finally, water flows to water outlet 114' located at the opposite end of the cylindrical chamber from water inlet 112'.

Water supplied to water inlet 112 may be pressurized to ensure that the water will flow from water inlet 112 through the porous media 120, 122, 124, 126 to water outlet 114 rapidly. In applications where an end use is an appliance or water dispensing device, appropriate water pressure will typically come from a municipal potable water source that is connected to water filter 100. As an example, potable water is typically supplied to (or reduced upon entry into) homes and business in the United States of America at a pressure of approximately 45 pounds per square inch ("PSI"). This pressure may fluctuate (e.g., between 30 PSI and 80 PSI) depending on the nature of the water supply, and some embodiments of the invention may be designed to accept a range of input pressure in order to accommodate different pressures or pressure fluctuations (e.g., pressure differences due to pressure standard variation in different countries and different applications. Different embodiments of the current invention may be tailored to function across a wide range of pressures by design of the porous media and housing 110 in order to function with different water supplies.

Some embodiments may be designed to function with low water supply pressures, such as the pressure created by the force of gravity in a two chamber pitcher type device, where untreated water is placed into an upper chamber with water-filtration system 10 forming the flow path to a lower chamber.

In some embodiments, housing 110 may include a filter-life indicator 150 that is designed to provide a visual indication of the remaining filter life (see FIGS. 3 and 4). Filter-life indicator 150 may be visible to a user looking at the exterior of housing 110 to provide an easy method of checking on filter life. An embodiment of filter-life indicator 150 may be a vertical strip that includes indicator lights, such as LEDs (light emitting diodes) that light up in a pattern that indicates the amount of filter life remaining.

Housing 110 may also include a communication interface 140 that provides a data communication path with a mating device, such as an appliance that contains water filter 100. Water filter 100 may communicate data such as filter life remaining and water flow rate to the mating device. One example of communication interface 140 is shown in FIG. 4.

Housing 110 may provide for easy replacement of water filter 100. For example, as shown in FIG. 3, housing 110 features a shoe-type attachment interface 132, which may be designed to mate with a receptacle in an appliance. Attachment interface 132 may allow a user to remove and replace water filter 100 without the use of tools. Housing 110 may slide free of a mating point and be replaced by another housing 110 that contains fresh filters. Another attachment interface may—instead of a shoe—be a tapered-cylinder connection that mates with a matching socket that might be found in an appliance like a refrigerator, as shown, for example, in FIG. 10.

Figure 11:
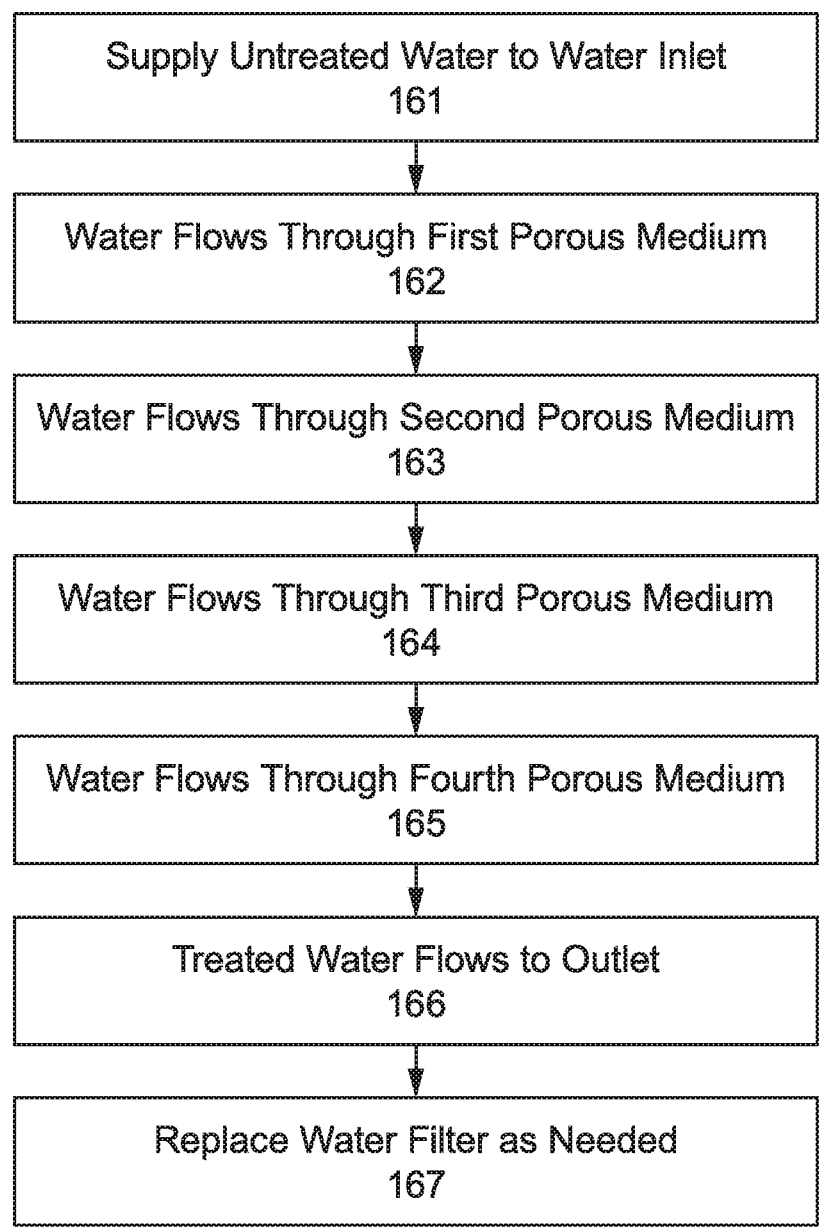
FIG. 11 is a flow chart of a method of use of an embodiment of a water-filtration system.

A method for using embodiments of the invention to filter water is illustrated in FIG. 11. In step 161, water is supplied to a water inlet 112 of housing 110. In step 162, water flows from water inlet 112 to and through first porous medium 120, which removes unwanted organic and inorganic compounds from water. In step 163, water flows to and through second porous medium 122, which removes microbial organisms from the water. In step 164, after exiting second porous medium 122, water flows to and through third porous medium 124, which removes unwanted minerals from the water and changes the level of total dissolved solids in the water. In step 165, water then flows to and through fourth porous medium 126, which adds certain minerals and compounds to water to enhance water taste. In step 166, the final product flows from fourth porous medium 126 to and through water outlet 114, which is connected to a desired end use. If and when the porous media become depleted or become otherwise noticeably reduced in efficacy, the user may perform step 167 to replace water filter 100 with a new one to maintain desired water quality and taste. The steps described above, and in particular steps 162-165, may be performed in any order.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the claims and their equivalents.

What is claimed is:

1. A water filter, comprising:
   a housing comprising a water inlet for receiving water and a water outlet for supplying water, wherein the water inlet is fluidly connected to the water outlet;
   a first porous medium comprising an activated carbon filter configured to remove organic and inorganic compounds from the water, wherein the first porous medium is fluidly connected to the water inlet and disposed inside the housing;
   a second porous medium comprising a membrane configured to remove microbial organisms from the water, wherein the second porous medium is fluidly connected to the water inlet and disposed inside the housing;
   a third porous medium comprising ion-exchange resin configured to adjust a level of dissolved minerals in the water, wherein the third porous medium is fluidly connected to the water inlet and disposed inside the housing; and
   a fourth porous medium configured to add a substance to the water, wherein the fourth porous medium is fluidly connected to the water inlet and disposed inside the housing,
   wherein the housing is configured to route water from the water inlet through each of the four porous media to the water outlet, and
   wherein the second porous medium surrounds the first porous medium, and
   wherein the housing is configured to route water through the first porous medium and then the second porous medium.

2. The water filter of claim 1, wherein the housing is further configured to route water through the first porous medium, followed by the second porous medium, followed by the third porous medium, and finally the fourth porous medium.

3. The water filter of claim 1, wherein the housing comprises a single chamber that contains all of the porous media.

4. The water filter of claim 1, wherein the housing comprises two cylindrical chambers, which each contain at least one of the porous media.

5. The water filter of claim 1, wherein the housing further comprises an attachment interface that enables the housing to be removed and replaced without tools.

6. A water-filtration system, comprising:
   the water filter of claim 1; and
   an appliance, wherein the housing is integrated into the appliance and fluidly connected to a water supply of the appliance.

7. The water filtration system of claim 6, wherein the water filter comprises a communication interface connected to the appliance for communicating data to the appliance.

8. The water filter of claim 1, further comprising a filter-life indicator configured to visually display an indication of the remaining life of the porous media.

9. The water filter of claim 1, wherein the water inlet and the water outlet are combined into a single connection configured to separate incoming water from outgoing water.

10. The water filter of claim 1, wherein the housing is further configured to route water through each of the first porous medium, the second porous medium, the third porous medium, and the fourth porous medium in series such that the water passes through each of the porous media once.

11. The water filter of claim 1, wherein the housing comprises a first cylindrical chamber and a second cylindrical chamber disposed parallel to each other such that the first cylindrical chamber and the second cylindrical chamber are side by side,
   wherein at least one of the first porous medium, the second porous medium, the third porous medium, and the fourth porous medium is disposed in the first cylindrical chamber and wherein at least one of the first porous medium, the second porous medium, the third porous medium, and the fourth porous medium is disposed in the second cylindrical chamber, and
   wherein the first cylindrical chamber and the second cylindrical chamber are fluidly connected to the water inlet and the water outlet.

12. A water filter, comprising:
   a housing comprising a water inlet and a water outlet;
   a first cylindrical chamber disposed within the housing;
   a second cylindrical chamber disposed within the housing,
   wherein the water inlet is fluidly connected to both the first chamber and the second chamber;
   a first porous medium disposed in one of the first chamber and the second chamber,
   wherein the first porous medium is configured to remove organic and inorganic compounds from the water;
   a second porous medium disposed in one of the first chamber and the second chamber, wherein the second porous medium is configured to remove microbial organisms from the water;
   a third porous medium disposed in one of the first chamber and the second chamber,
   wherein the third porous medium is configured to remove minerals from the water; and
   a fourth porous medium disposed in one of the first chamber and the second chamber, wherein the fourth porous medium is configured to enhance water taste by adding minerals and compounds to the water,
   wherein water that enters the water inlet passes through each of the plurality of porous media before reaching the water outlet,
   wherein the housing is configured to route water through the first porous medium, the second porous medium, the third porous medium, and the fourth porous medium in that order.

13. The water filter of claim 12, wherein two of the porous media are disposed in the first chamber, and wherein two of the porous media are disposed in the second chamber.

14. A water-filtration system, comprising:
   the water filter of claim 12; and
   an appliance, wherein the housing is integrated into the appliance and fluidly connected to a water supply of the appliance.

15. The water filter of claim 12, wherein the first chamber is disposed next to and parallel with the second chamber.

* * * * *